UNITED STATES PATENT OFFICE 2,311,485

ZEIN COMPOUND

Oswald C. H. Sturken, Closter, N. J., assignor to Corn Products Refining Company, New York, N. Y., a corporation of New Jersey No Drawing. Application April 25, 1940, Serial No. 331,599

2 Claims. (Cl. 106—153)

This invention relates to films, coatings, impregnating strata, filaments, or other bodies containing zein, the alcohol soluble constituent of corn (maize) protein, and to solutions or compounds from which said films, or other bodies are made. The invention relates, more particularly but not exclusively, to coatings containing zein and to compounds suitable for coating paper, cardboard, textile fabric, and the like.

The object of the invention is to provide a zein containing body which will be more permanently cohesive than previously known zein containing bodies, that is, in which the development of brittleness will be prevented or at least very much delayed whereby, in the case of films, coatings, or the like, the film or coating will be more permanently or enduringly flexible than the ordinary zein film or coating. A further object is to accomplish this result without causing the film or other body to "blush," as a consequence of the precipitation of a constituent or constituents of the compound.

The invention is based upon the discoveries, first that the incorporation of sorbitol, or its equivalent, in substantial amounts in the zein body will impart to it the above mentioned desirable characteristics; and second, that sorbitol, which in itself is compatible with zein in quantities too small to beneficially affect the character of the zein body to any substantial extent, may be made compatible in sufficient amount to effect such result if there be incorporated in the zein solution or compound, and present in the film, certain substances, commonly called zein plasticizers, such for example as triethanolamine which, besides having their expected plasticizing effect, possess the property of increasing the compatibility of sorbitol in a solidified zein compound such as a film of coating.

Sorbitol itself is compatible with zein to the extent of about 2½%, based upon the weight of the zein. By incorporating triethanolamine, or other equivalent zein plasticizer and sorbitol solvent, the compatibility of the sorbitol with the zein may be increased to as much as 20%, based upon the weight of the zein, without danger of the sorbitol precipitating out of the film and causing blushing.

A zein coating is conventionally made by spreading a solution of zein and a low boiling point alcohol on the surface to be coated, for example on a sheet of paper, and solidifying the material and consolidating the film by evaporation of the solvent either without heating, or, preferably, with the application of heat.

The preferred zein solvent, according to the present invention, is aqueous ethyl alcohol (which may be denatured) of about 95% concentration by volume. But any readily volatilizable zein solvent or solvent mixture which is compatible with sorbitol and with the plasticizer or plasticizers used for increasing the compatibility of the sorbitol in the film, may be used, as for example, anhydrous methyl alcohol, aqueous isopropyl alcohol, ethylene glycol monoethylether, or mixtures of these with each other or with toluol.

In place of sorbitol one may use mannitol or dulcitol, or any hexahydric aliphatic alcohol compatible with the plasticizer which is used for increasing the compatibility of the sorbitol.

In place of triethanolamine any zein plasticizer may be used which is also a solvent for sorbitol, for example diethylene glycol, triethylene glycol, dibutyl tartrate, monobutyl phthalate and diethylene glycol monobutylether.

There may be incorporated in the zein body other substances intended to impart thereto special desired characteristics. For example, in order to increase gloss, there may be incorporated in the film rosin, hydrogenated rosin, or ester gum. Toluol may be used as a diluent to aid in the spreading of the solution as a film and, because of its higher boiling point than ethyl alcohol, to maintain in proper dispersion the other ingredients of the coating, after the alcohol has been evaporated, so as to insure the proper consolidation of the film without precipitation of any of its constituents.

The present invention is not concerned with these additional substances, or other substances that may be added for various purposes, except to indicate that such additions may be made to the compound of applicant's invention without affecting its character in respect to the use of sorbitol or its equivalent.

The following specific examples will illustrate the application of the invention to practice. It will be understood that these examples are purely informative and typical. The invention is not to be considered as limited to the particular substances specified in the examples, that is to say where equivalents have been indicated, nor to the specified proportions. The intention is to cover all equivalents and also all modifications of the specific examples within the scope of the appended claims.

*Example 1.*—The coating compound is composed of the following substances in proportions by weight as follows, preferred ranges being indicated in parentheses:

|  | Parts |  |
|---|---|---|
| Zein | 100 |  |
| 95% ethyl alcohol | 400 | (200–600) |
| Sorbitol | 20 | (5–20) |
| Triethanolamine | 20 | (20–50) |

*Example 2.*—The solution here consists of the following substances in proportions by weight as follows:

|  | Parts |  |
|---|---|---|
| Zein | 100 |  |
| Sorbitol | 10 | (5–20) |
| Diethylene glycol | 20 | (10–50) |
| Anhydrous methyl alcohol | 300 | (200–400) |
| Cellosolve (ethylene glycol monoethylether) | 100 | (50–150) |
| Toluol | 50 | (50–150) |

*Example 3.*—The compound here consists of the following substances in proportions by weight as follows:

|  | Parts |  |
|---|---|---|
| Zein | 100 |  |
| Triethylene glycol | 30 | (20–50) |
| Sorbitol | 15 | (5–20) |

This example illustrates a composition suitable for plastic purposes. Since the triethylene glycol is both a zein and a sorbitol solvent, it is unnecessary, when the composition is to be used as a plastic, to use the low boiling point solvent such as the ethyl alcohol of the other compositions.

*Example 4.*—The composition here consists of the following substances in proportions by weight as follows:

|  | Parts |  |
|---|---|---|
| Zein | 100 |  |
| 95% ethyl alcohol | 400 | (100–600) |
| Sorbitol | 20 | (5–20) |
| Triethanolamine | 20 | (20–50) |
| Ester gum | 30 | (15–150) |

This example illustrates the use of an additional substance, outside of the scope of the present invention, to-wit, ester gum, for the purpose of giving heightened gloss.

In all of these cases the use of sorbitol in the quantities indicated prevents the impairment of cohesiveness and consequently prevents or delays, at least, the development of brittleness, and in the case of thin zein bodies such as coatings, imparts to the coating an enduring flexibility. The relative permanence of flexibility will depend, naturally, upon the amount of the sorbitol used within limits, at least. The sorbitol does not appear to give appreciable increase in the permanence of flexibility unless the amount used is 5% or more; and it does not seem practical to introduce into the film more than about 20% of sorbitol, this appearing to be the upper limit of compatibility of sorbitol in a zein dispersion, both figures being based upon the weight of the zein.

Why sorbitol, or its equivalent hexahydric alcohol delays the development of brittleness in a zein containing body, and in the case of films or coatings, contributes to the permanence of flexibility, is not fully understood. It is believed that the hygroscopic properties of sorbitol explain the phenomenon. Water itself imparts flexibility to a zein film or coating, and it is quite possible that with sorbitol in the film a small amount of water is absorbed into and is kept in the film so as to assist in maintaining its flexibility.

This application is a continuation-in-part of pending application of Oswald C. H. Sturken, Serial No. 286,084, filed July 24, 1939.

I claim:

1. A zein film containing the following substances in proportions by weight as follows: zein 100 parts, sorbitol 5–20 parts, triethanolamine 20–50 parts.

2. A compound containing the following substances in the proportions by weight substantially as follows: zein 100 parts; 95% ethyl alcohol 200 to 600 parts; sorbitol 5 to 20 parts; triethanolamine 20 to 50 parts.

OSWALD C. H. STURKEN.

CERTIFICATE OF CORRECTION.

Patent No. 2,311,485. February 16, 1943.

OSWALD C. H. STURKEN.

It is hereby certified that error appears in the printed specification of the above numbered patent requiring correction as follows: Page 1, first column, line 49, for "conventionally" read --conveniently--; page 2, first column, line 43, in the table in Example 4, for "(15-150)" read --(15-100)--; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.